United States Patent
Zarewych et al.

(10) Patent No.: US 8,251,440 B2
(45) Date of Patent: Aug. 28, 2012

(54) MULTI-SEGMENTED HEADLINER HAVING LONGITUDINAL JOINT

(75) Inventors: Lara Daniv Zarewych, Troy, MI (US); Jeffrey T. Baxter, Carleton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 479 days.

(21) Appl. No.: 11/744,244

(22) Filed: May 4, 2007

(65) Prior Publication Data

US 2008/0272622 A1  Nov. 6, 2008

(51) Int. Cl.
*B60J 7/00* (2006.01)
(52) U.S. Cl. ........................................ 296/214
(58) Field of Classification Search .................. 296/214
See application file for complete search history.

(56) References Cited

U.S. PATENT DOCUMENTS

| | | | |
|---|---|---|---|
| 2,879,105 A * | 3/1959 | Stahl | 296/214 |
| 3,042,446 A * | 7/1962 | Stahl | 296/214 |
| 3,827,137 A | 8/1974 | Schubach | |
| 3,953,067 A | 4/1976 | Isola | |
| 3,981,107 A | 9/1976 | Schubach | |
| 4,840,832 A * | 6/1989 | Weinle et al. | 428/156 |
| 4,893,866 A | 1/1990 | Dowd et al. | |
| 5,893,603 A | 4/1999 | Viertel et al. | |
| 6,120,091 A * | 9/2000 | Reich et al. | 296/214 |
| 6,460,919 B2 | 10/2002 | Bienert et al. | |
| 6,676,203 B2 | 1/2004 | Lumpe et al. | |
| 6,860,014 B2 | 3/2005 | Wieschermann et al. | |
| 6,862,809 B2 | 3/2005 | Wieschermann et al. | |

* cited by examiner

*Primary Examiner* — Joseph Pape
(74) *Attorney, Agent, or Firm* — Shook, Hardy & Bacon LLP

(57) ABSTRACT

The multi-segmented headliner for a vehicle includes an elongated intermediate segment, an elongated first side segment, and an elongated second side segment. In one configuration the segments are separate and form the complete headliner on assembly inside the roof of the vehicle. In another configuration the segments are joined together in a single piece, with the side segments being movable relative to the intermediate segment. Both configurations permit the replacement of the headliner of a van or sport utility by moving the headliner either in separate segments, or folded if a single piece, through the opening defined by the rear door or liftgate of the vehicle.

5 Claims, 6 Drawing Sheets

MULTI-SEGMENTED HEADLINER HAVING LONGITUDINAL JOINT

TECHNICAL FIELD

The embodiments of the disclosed invention relate generally to headliners for vehicles. More particularly, the embodiments relate to a multi-segmented headliner for a vehicle which can be readily installed on the roof of the vehicle.

BACKGROUND OF THE INVENTION

Vehicle headliners are used to both cover the bare material (usually metal) of the vehicle roof and to provide protection to the vehicle occupant in a crash event. Headliners are typically composed of multiple layers which include a relatively rigid or semi-rigid backing and an outer cover of a woven or non-woven material which is color-coordinated to the rest of the vehicle for aesthetic purposes.

Headliners are typically composed of a single molded piece of material. The outer cover may be added to the molded piece after formation or may be molded with the backing in a single mold during a single or multi-stepped process. The headliner of a vehicle must be wide enough not only to provide coverage for the roof, but also must be wide enough to cover the area between the roof and the side walls. In vans and in sport utility vehicles the headliner is both wide and long, usually long enough to cover the entire area of the roof from the windshield opening to the rear door or liftgate opening. Ordinarily the considerable width prohibits passage of the headliner through the rear opening of the van or sport utility vehicle. On initial vehicle assembly this prohibition is not usually a problem as the windshield has not yet been installed and the headliner can be passed through the windshield opening. However, replacement of a van or sport utility headliner after the vehicle has been assembled is a time-consuming task. In the modern vehicle the windshield is maintained in position by a weather sealing strip that is attached by very strong adhesives to the walls that define the windshield opening. This makes removal of the windshield anticipatory to the removal of the old headliner and installation of the replacement headliner very difficult and costly.

As an alternative to removing the windshield, attempts have been made to pass the single piece headliner through the rear opening of the van and the sport utility vehicle. However, this opening is most ordinarily narrower than is the windshield opening and, as a consequence, the single piece headliner is too wide to permit the passage of the headliner through the rear opening without bending the piece and creating a permanent crease mark in the outer cover. Complicating this procedure is the fact that rear door and tailgate components (such as the doors and tailgates themselves as well as the liftgate struts) interfere with the procedure.

Accordingly, as in so many areas of vehicle technology, there is room in the art of vehicle headliner design for providing a headliner arrangement which may be installed or replaced in a vehicle's interior without the need to remove the vehicle's windshield.

SUMMARY OF THE INVENTION

The headliner assembly for a vehicle is set forth herein in its different configurations. In general, the disclosed headliner assembly includes a headliner which has three segments. The headliner has a long axis. One of the three segments is an intermediate segment that has a first longitudinal edge that is substantially parallel to the long axis of the headliner. The intermediate segment also includes a second longitudinal edge that is substantially parallel to the long axis of the headliner. The other two segments are side segments which include a first side segment and a second side segment. The first side segment has a longitudinal edge that is fittable to the first longitudinal edge of said intermediate portion. Similarly, the second side segment has a longitudinal edge that is fittable to the second longitudinal edge of the intermediate portion.

In one configuration the intermediate and side segments are initially provided separate from one another and form the complete headliner assembly on the roof of the vehicle. Once the three segments are positioned within the interior of the vehicle, they may either be joined and then installed on the vehicle roof as a joined assembly or the segments may be individually attached to the roof. If individually attached to the roof the intermediate segment may be attached to the roof first with the side segments entirely or partially holding the intermediate segment in place. Alternatively the side segments can be installed first followed by installation of the intermediate segment.

In another configuration the intermediate and side segments are joined together when manufactured, with the side segments being movable relative to the intermediate segment. Both configurations permit the replacement of the headliner of a van or sport utility by moving the headliner either in separate segments or folded if a single piece through the opening defined by the rear door or liftgate of the vehicle.

Other features of the various embodiments of the invention will become apparent when viewed in light of the detailed description of the preferred embodiments when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
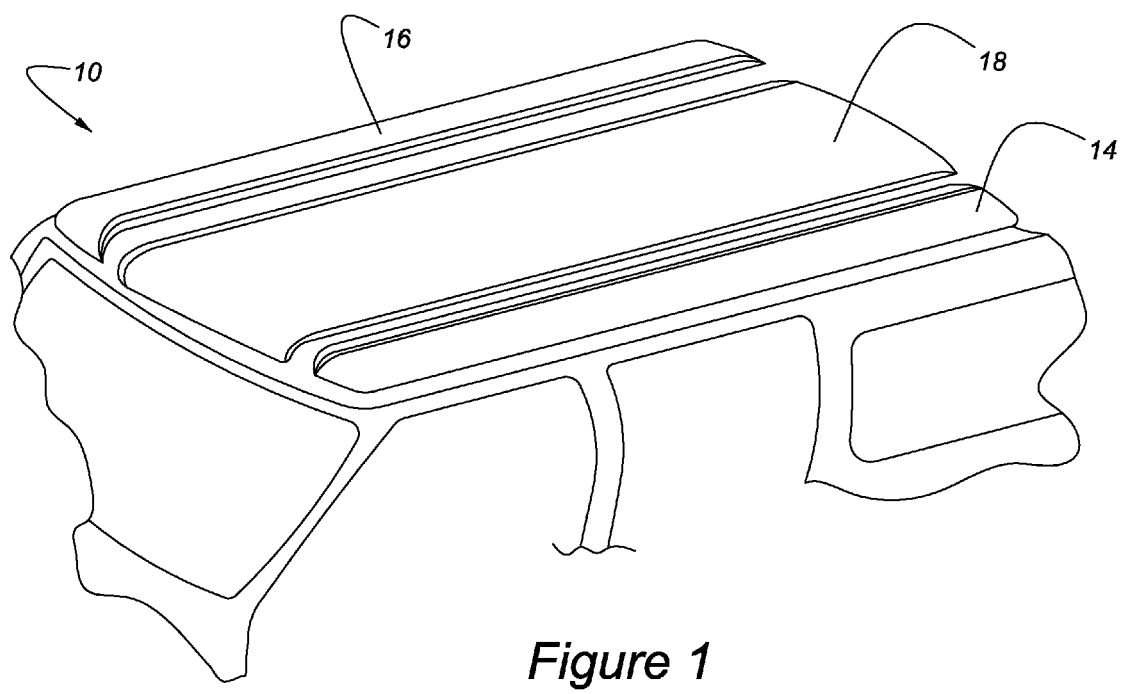
FIG. 1 illustrates a partial perspective view of the headliner assembly in relative position as it would appear prior to placement in a vehicle, also shown in partial perspective view.

In the following figures, the same reference numerals will be used to refer to the same components. In the following description, various operating parameters and components are described for plural constructed embodiments. These specific parameters and components are included as examples and are not meant to be limiting.

With reference to FIG. 1, a partial perspective view of an embodiment of the headliner assembly of the disclosed invention, generally illustrated as 10, is shown. The headliner assembly 10 is shown in its general position prior to installation in the roof of a vehicle of which a partial vehicle, generally illustrated as 12, is shown. While the present invention finds particular utility in a passenger van or in a sports utility vehicle, it is to be understood that the headliner of the present invention may well be fitted in other vehicles while still achieving the general goal of the present invention which is to provide a headliner which can be readily installed in a vehicle interior without the need to remove the vehicle's windshield. By providing a headliner of the disclosed invention which can be reduced from its installed dimension to a pre-installation dimension, the headliner can be passed through openings of the vehicle including the tailgate and door opening for replacement. This arrangement also allows for added flexibility at the installation stage.

The headliner assembly 10 includes a first side panel 14, a second side panel 16 positioned opposite said first side panel 14, and an intermediate panel 18. The panels 14, 16 and 18 are shown spaced apart from one another as they would appear prior to installation according to the present embodiment of the invention. While three panels 14, 16 and 18 are disclosed, it is to be understood that as few as two panels and more than three may be used while keeping within the spirit of the present invention.

The panels 14, 16 and 18 may be made from materials known in the art. In general the panels 14, 16 and 18 include an inner structural layer and an outer cover layer. Other layers may be included as desired for both structural and acoustic enhancement. Preferably, but not exclusively, the side panels 14 and 16 are composed of a structural, impact-absorbing material while the intermediate panel 18 is an acoustic panel. The acoustic material may be any of a variety of materials, including a sound absorbing foamed layer or a fibrous polyethylene terephthalate material. The structural, impact absorbing material may also be of any of a variety of materials, including ABS plastic and fiberglass. The outer cover layer (or the A surface) is generally composed of a fabric which is attached to the inner layer either during the formation process or after each layer is prepared individually. The outer cover layer may also be composed of a variety of materials, including woven and non-woven cloth.

Figure 2:
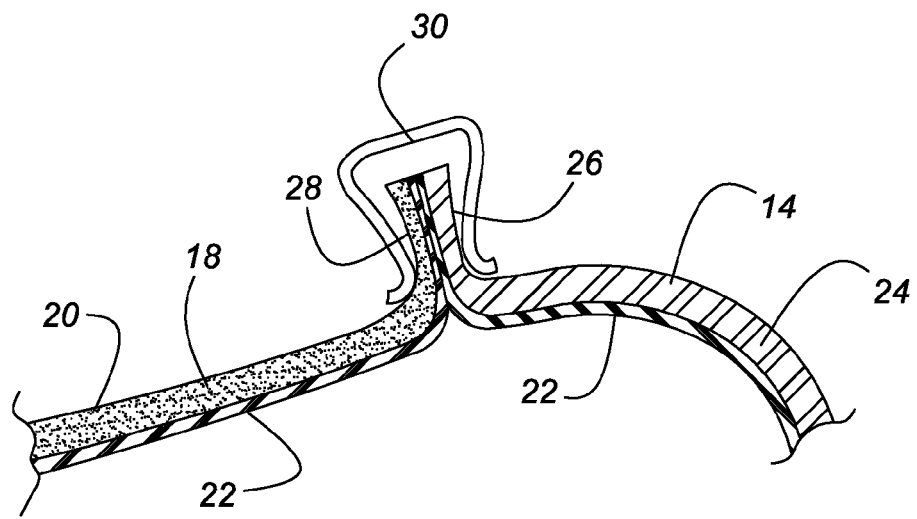
FIG. 2 is a sectional view of a portion of a joint of two panels connected by a clip according to the first embodiment of the panel-connecting arrangement of the invention.

The suggested layering of the panels 14, 16 and 18 are illustrated in FIGS. 2 through 8. Referring first to FIG. 2, a portion of the intermediate panel 18 is shown. The intermediate panel 18 includes an inner acoustic layer 20 and an outer cover layer 22. Also shown in FIG. 2 is a portion of the side panel 14 which includes an inner impact absorbing layer 24 and the outer cover layer 22.

The panels 14, 16 and 18 of the present invention may be joined to one another and to the roof of the vehicle 12 by different methods. Such methods are disclosed in FIGS. 2 through 5 which are intended as being illustrative rather than limiting. In addition to showing the possible layering of the outer panel 14 and the intermediate panel 18, FIG. 2 also illustrates an embodiment of the method of joining two adjacent panels. According to this embodiment, the side panel 14 includes a joining end 26 which is angled relative to the rest of the outer panel 14. Similarly, the intermediate panel 18 includes a joining end 28 which is angled relative to the rest of the intermediate panel 18. The joining end 26 and the joining end 28 are positioned so that they abut one another as illustrated. A spring clip 30 is provided to maintain the abutment illustrated in FIG. 2. The spring clip 30 may be a long, continuous clip that is fitted substantially along the length of the abutment defined by the joining end 26 and the joining end 28 or may be one of several of the same clips positioned at spaced intervals along the length of the abutment. A visually pleasing appearance is formed at the abutment of the two panels 14 and 18.

Figure 3:
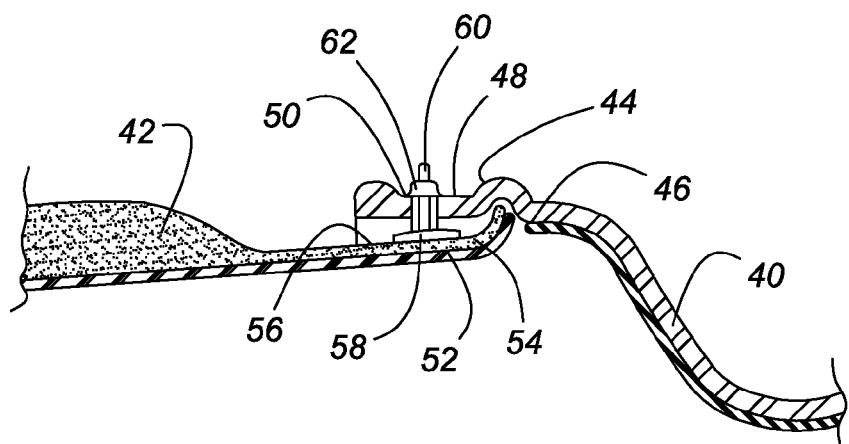
FIG. 3 is a sectional view of a portion of a joint of two panels connected by a clip according to the second embodiment of the panel-connecting arrangement of the invention.

An alternative method of joining two adjacent panels is illustrated in FIG. 3 which shows two sectional views of a side panel 40 and an intermediate panel 42. The panels 40 and 42 are similar respectively to the panels 14 and 18 in configuration and composition. However, the arrangement for joining the two panels varies from the arrangement illustrated in FIG. 2. Specifically, the side panel 40 includes an attachment end 44 which includes a channel 46 that is formed substantially along the entire length of the attachment end 44. The attachment end 44 also includes a fastener attachment surface 48 and a fastener-passing aperture 50 formed therethrough. The intermediate panel 42 includes an attachment end 52 which has a flange 54 formed substantially along the entire length of the attachment end 52. As illustrated, the attachment end 52 nests substantially within the channel 46. A visually pleasing appearance is formed along the seam of the mated panels 40 and 42.

The attachment end 52 of the intermediate panel 42 also includes a fastener surface 56 to which the base of a fastener 58 is attached by an adhesive or by mechanical attachment. The fastener 58 has a stud portion 60 extending therefrom and through the fastener-passing aperture 50 of the attachment end 44 of the side panel 40. The attachment end 44 of the side panel 40 is drawn tight against the attachment end 52 of the intermediate panel 42 by fitting of a nut such as a pal nut 62 on the stud portion 60 as illustrated in FIG. 3. Alternate fasteners may be employed other than the arrangement illustrated provided that the side panel 40 is snugly mated with the intermediate panel 42.

The panels 14 and 18 shown in FIG. 2 and the panels 40 and 42 shown in FIG. 3 may be attached to the roof of the vehicle 12 by any of a number of known methods of attachment including mechanical fasteners or adhesives. Possible methods of attaching the panels to the vehicle ceiling as well as to one another are shown in FIGS. 4 and 5.

Figure 4:
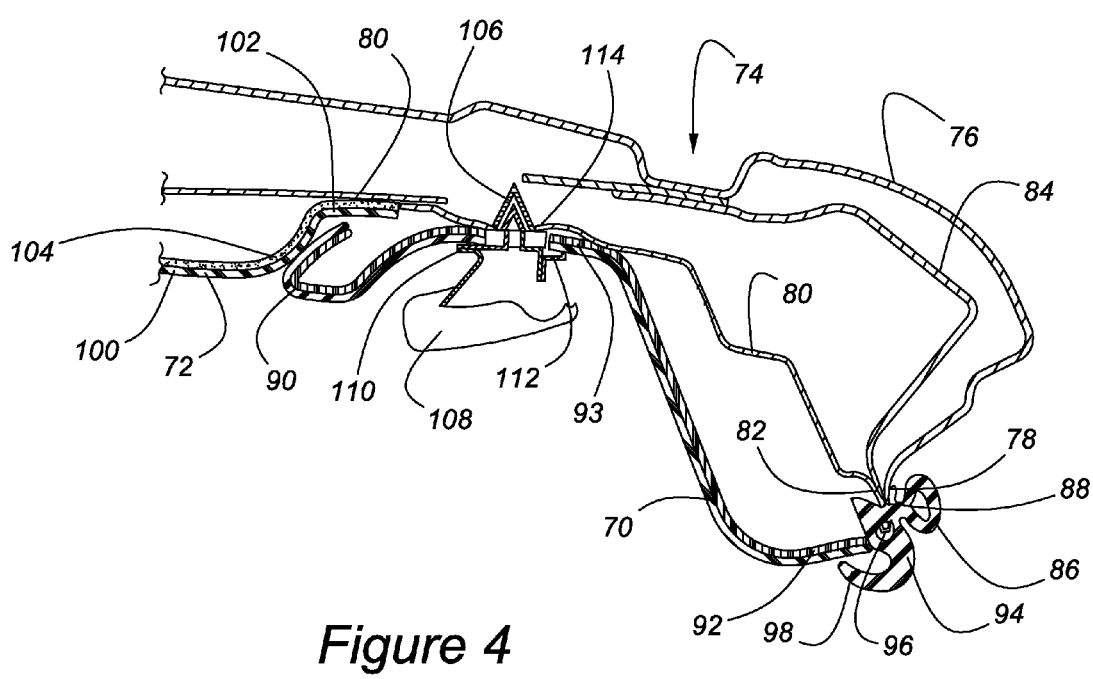
FIG. 4 is a sectional view of a portion of two panels illustrating an arrangement for attaching the panels to the roof of a vehicle according to the first embodiment of the panel-attaching arrangement of the invention.
Figure 5:
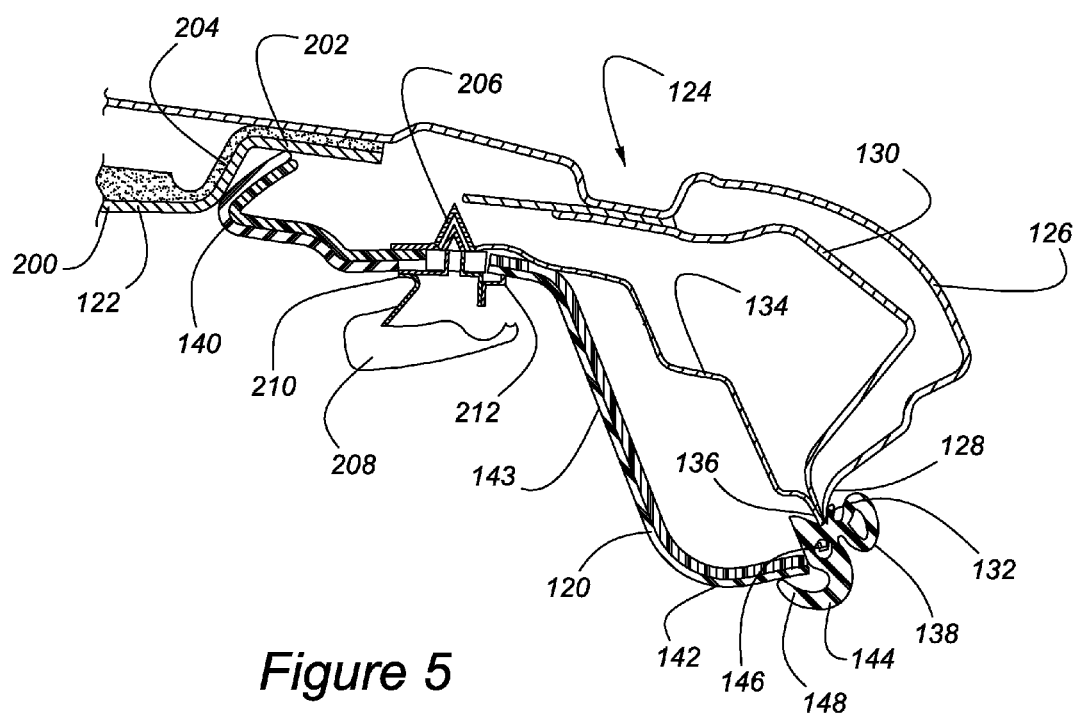
FIG. 5 is a sectional view of a portion of two panels illustrating an arrangement for attaching the panels to the roof of a vehicle according to the second embodiment of the panel-attaching arrangement of the invention.

With reference to FIG. 4, a sectional view of a portion of two panels, a side panel 70 and in intermediate panel 72 is shown in relation to a portion of a vehicle, generally illustrated as 74. The vehicle 74 includes an outer roof structural portion 76 having an outer edge 78, an inner roof structural portion 80 having an outer edge 82, and an intermediate roof structural portion 84 having an outer edge 86. The outer edges 78, 82 and 86 convene along a common edge 88 and are fastened to one another to form the common edge 88 by spot welding or by other known joining techniques. The structural roof portions 76, 80 and 84 are shown for illustrative purposes only and are not intended as being limiting as other configurations could be adapted for use as well.

The side panel 70 includes an inner edge 90, an outer edge 92, and a body 93. The outer edge 92 is held in place adjacent to the common edge 88 by a polymerized weather strip 94 having a channel 96 formed therein which is held in place along the common edge 88 by friction. The weather strip 94 also has a lip 98 which extends vehicle inward.

The inner edge 90 generally defines an area of the side panel 70 that is inwardly folded back onto itself as illustrated in FIG. 4.

The intermediate panel 72 includes a body 100 which generally defines a first plane and an outer edge 102 which generally defines a second plane, the first and second planes being different. The body 100 and the outer edge 102 are joined by a wall 104. The outer edge 92 of the outer panel 70 is held in position relative to the roof of the vehicle 74 by tension of the lip 98 of the weather strip 94. The inner edge 90 substantially nests along the wall 104 and the outer edge 102 of the intermediate panel 72 and thereby holds the intermediate panel 72 in place against the inner roof structure portion 80. Fasteners or adhesives, while usable for this fitting, are thus rendered unnecessary in holding the intermediate panel 72 in place.

In addition to the lateral support provided by the lip 98 of the weather strip 94, the side panel 70 is held in place by one or more mechanical fasteners which may be of a variety of different configurations. A preferred fastener is a spring fastener 106. The spring fastener 106 may be a stand-alone fastener or, as illustrated, may be part of a grab handle assembly 108. As illustrated, the grab handle assembly 108 includes a grommet 110 having a peripheral flange 112. A fastener aperture 114 is formed through the body 93 of the side panel 70 through which the spring fastener 106 extends. The peripheral flange 112 abuts the outer area surrounding the fastener aperture 114 and thus assists in holding the side panel 70 in place against the inner roof structural portion 80.

While the spring fastener 106 as part of the grab handle assembly 108 is illustrated as the method of attaching the side panel 70 to the inner roof structural portion 80, it is to be understood that other methods of attachment may be employed. Such arrangements for attachment include nylon "Christmas tree" style fasteners and other spring fasteners which are attached to the inner layer of the side panel 70 so as not to be seen by the vehicle passenger.

A variation of the arrangement for attaching the intermediate and side panels to the roof of a vehicle is shown in FIG. 5. With respect to that figure, a sectional view of a portion of two panels, a side panel 120 and an intermediate panel 122, is shown in relation to a portion of a vehicle, generally illustrated as 124. The vehicle 124 includes an outer roof structural portion 126 having an outer edge 128, an inner roof structural portion 130 having an outer edge 132, and an intermediate roof structural portion 134 having an outer edge 136. The outer edges 128, 132 and 136 convene along a common edge 138 and are fastened to one another to form the common edge 138 by spot welding or by other known joining techniques. As shown, the inner roof structural portion 130 does not extend as far vehicle inward as does the inner roof structural portion 80 of the embodiment shown in FIG. 4.

With reference still to FIG. 5, the side panel 120 includes an inner edge 140, an outer edge 142, and a body 143. The inner edge 140 is angled back slightly toward the body 143. The outer edge 142 is held in place adjacent to the common edge 138 by a polymerized weather strip 144 having a channel 146 formed therein which is held in place along the common edge 138 by friction. The weather strip 144 also has a lip 148 which extends vehicle inwardly.

The intermediate panel 122 includes a body 200 which generally defines a first plane and an outer edge 202 which generally defines a second plane, the first and second planes being different. The body 200 and the outer edge 202 are joined by a wall 204. The outer edge 142 of the outer panel 120 is held in position relative to the roof of the vehicle 124 by tension of the lip 148 of the weather strip 144. A portion of the inner edge 140 substantially nests along the wall 204 and the outer edge 202 of the intermediate panel 122 and thereby holds the intermediate panel 122 in place against the underside of the outer roof structural portion 126. Consistent with the method of holding the intermediate panel 72 in place as set forth in FIG. 4, fasteners or adhesives, while usable for this fitting, are thus rendered unnecessary in holding the intermediate panel 122 in place.

In addition to the lateral support provided by the lip 148 of the weather strip 144, the side panel 120 is held in place by one or more mechanical fasteners of which the illustrated fastener is a spring fastener 206. The spring fastener 206 may be a stand-alone fastener or, as illustrated, may be part of a grab handle assembly 208. The grab handle assembly 208 includes a grommet 210 having a peripheral flange 212. A fastener aperture 214 is formed through the body 143 of the side panel 120 through which the spring fastener 206 extends. The peripheral flange 212 abuts the outer area surrounding the fastener aperture 214 and thus assists in holding the side panel 120 in place against the inner roof structural portion 130.

While the spring fastener 206 as part of the grab handle assembly 208 is illustrated as the method of attaching the side panel 120 to the inner roof structural portion 120, it is to be understood that other methods of attachment may be employed as set forth above with respect to FIG. 4.

Figure 7:
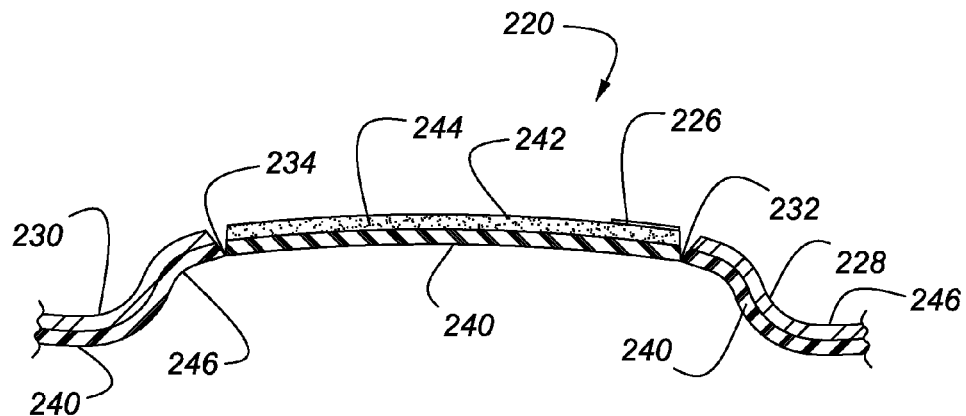
FIG. 7 is a sectional view of the headliner of FIG. 6 taken along lines 7-7 of that figure.
Figure 8:
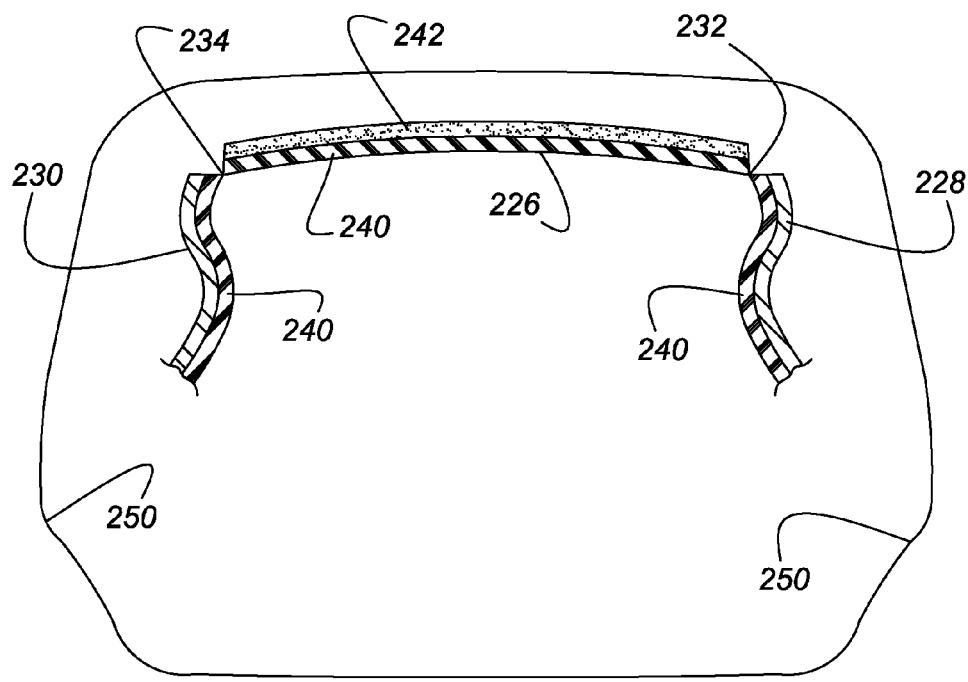
FIG. 8 is a sectional view of the alternate embodiment of the headliner of the invention similar to that shown in FIG. 7 showing the side panels in their folded positions for fitting through an area defined by the inside edge of a vehicle liftgate.

Also as set forth above, one object of the disclosed invention is to provide a practical and time-efficient approach to replacing or repairing the headliner of a vehicle without the need to remove the windshield. The embodiment disclosed in FIGS. 1 through 5 is a multi-piece headliner. On assembly or repair, the intermediate panel is brought into the vehicle interior followed by the outer panels. The side panels are then attached to the intermediate panel to form a headliner assembly. The headliner assembly is then attached to the roof of the vehicle. This is the approach of the embodiment shown in FIG. 2. As an alternative, and as shown in the embodiments of FIGS. 3 through 5, the intermediate panel is brought into the vehicle interior and is then installed on the roof of the vehicle. The outer panels are then brought into the vehicle interior and are installed. Both of these approaches rely on the headliner being provided as separate pieces. As an alternative to the multi-piece headliner, a single-piece headliner may be used as illustrated in FIGS. 6 through 8.

Figure 6:
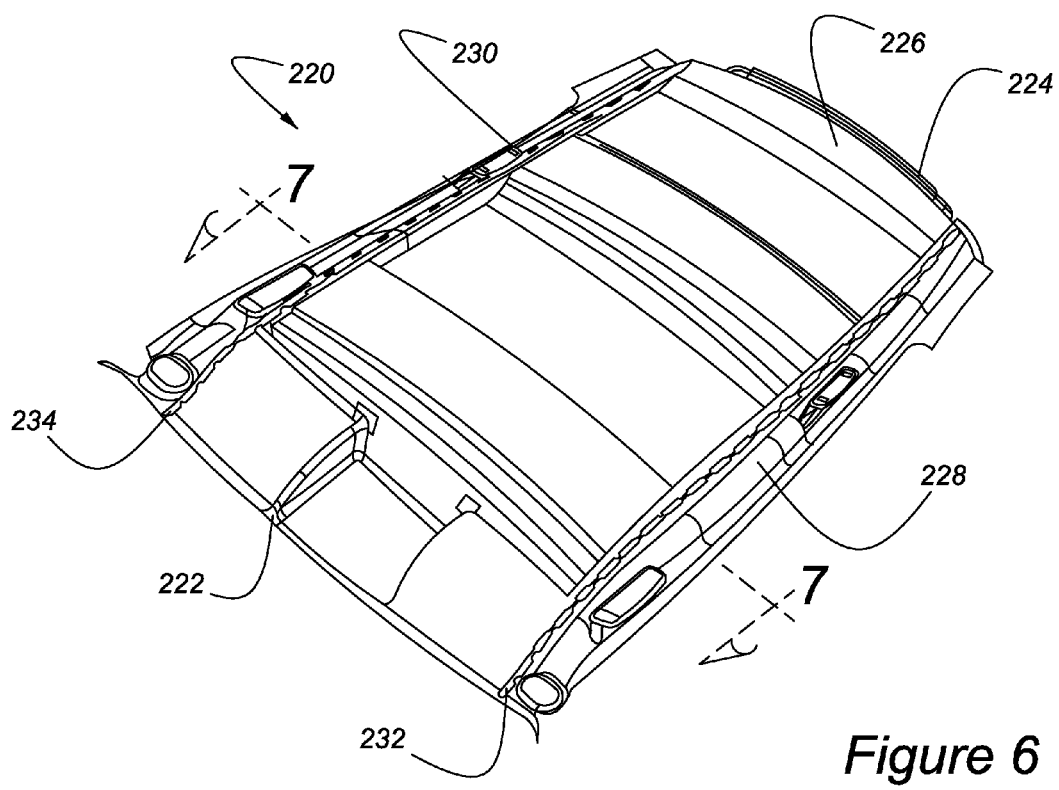
FIG. 6 is a perspective view of an alternate embodiment of the headliner of the invention.

With reference to FIG. 6, a single-piece headliner, generally illustrated as 220, is shown. The single-piece headliner 220 has a leading edge 222 which faces vehicle forward when installed and a trailing edge 224. The single-piece headliner 220 further includes an intermediate portion 226, a first side portion 228 and a second side portion 230. The first side portion 228 is attached to the intermediate portion 226 along a longitudinal, flexible joint 232. The second side portion 230 is attached to the intermediate portion 226 along a longitudinal, flexible joint 234.

The single-piece headliner 220 is preferably multi-layered and is composed of the same or similar materials as disclosed above with respect to the embodiments shown and discussed in relation to FIGS. 2 and 3. The single-piece headliner 220 may be composed of an inner layer and an outer layer or may be composed of more layers. Proposed layering of the single-piece headliner 220 is disclosed in FIGS. 7 and 8, of which FIG. 7 is a sectional view taken along lines 7-7 of FIG. 6. As illustrated, the single-piece headliner 220 is shown in its unfolded configuration as would be the case if it was installed in the vehicle interior.

The single-piece headliner 220 has an inner cover layer 240 which runs the entire width (and length) of the headliner 220 as shown. The inner cover layer 240 is a single piece of material. The single-piece headliner 220 also includes an inner layer 242 which may be a combination of an acoustic layer 244 which backs the intermediate portion 226 and an inner impact absorbing layer 246 which backs the side portions 228 and 230 as illustrated or the inner layer 242 may be composed of a single material. In either event, the inner layers which back the side portions 228 and 230 are integral with the intermediate portion 226 and are flexibly joined therewith along the longitudinal, flexible joints 232 and 234 respectively. The longitudinal, flexible joints 232 and 234 are formed along and between the intermediate portion 226 and the side portions 228 and 230 by molding or by post-mold forming through cutting or routing.

As shown in FIG. 7, the width of the single-piece headliner 220 is considerable and would not be passable through the rear of the vehicle as defined by the rear door or lift-gate opening of a van or a sport utility vehicle, respectively. Such an opening is illustrated as the outline 250 of the lift-gate opening shown in FIG. 8. To enable insertion of the single-piece headliner 220 into the vehicle's interior without removing the windshield, the side portions 228 and 230 are folded along the longitudinal, flexible joints 232 and 234 as illustrated in FIG. 8. The folding of the side portions 228 and 230 reduces the overall width of the single-piece headliner 220 to allow for insertion through the rear door or lift-gate opening. Once the single-piece headliner 220 has been placed into the vehicle's interior, the side portions 228 and 230 are generally unfolded to be returned to the configuration illustrated in FIG. 7. The single-piece headliner 220 is then attached to the roof of the vehicle by fasteners or adhesives.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method for installing a headliner assembly into a vehicle having a long axis and an interior, an interior roof and a rear door opening, the method comprising the steps of:
   obtaining an intermediate segment, a first side segment, and a second side segment,
   moving said intermediate segment, said first side segment, and said second side segment through the rear door opening and into the vehicle interior;
   creating a first set of butt joints and a first set of lap joints between the first side segment and the intermediate segment;
   creating a second set of butt joints and a second set of lap joints between the second side segment and the intermediate segment;
   attaching the side segments to the intermediate segment to form the headliner assembly by attaching spring clips at the butt joints and stud-style fasters at the lap joints; and
   positioning the side segments and the intermediate segment onto the interior roof of the vehicle to install the headliner assembly.

2. A headliner assembly for a vehicle, the headliner assembly comprising:
   an intermediate segment having a first longitudinal edge and a second longitudinal edge that is substantially parallel to the first longitudinal edge,
      wherein the first longitudinal edge includes a first plurality of bent segments extending at an angle relative to the intermediate segment and a first plurality of substantially straight segments extending substantially straight relative to the intermediate segment, each substantially straight segment of the first plurality positioned between a respective pair of bent segments of the first plurality, and
      wherein the second longitudinal edge includes a second plurality of bent segments that extend at an angle relative to the intermediate segment and a second plurality of substantially straight segments that extend substantially straight relative to the intermediate segment, each substantially straight segment of the second plurality positioned between a respective pair of bent segments of the second plurality,
   a first side segment separate from said intermediate segment and having a longitudinal edge, which includes first-side-segment bent portions that form butt joints with the first plurality of bent segments and includes first-side-segment straight portions that form lap joints with the first plurality of substantially straight portions; and
   a second side segment separate from said intermediate segment and having a longitudinal edge, which includes second-side-segment bent portions that form butt joints with the second plurality of bent segments and includes second-side-segment straight portions that form lap joints with the second plurality of substantially straight portions.

3. The headliner assembly of claim 2 further comprising, a plurality of spring clips that attach at the butt joints and a plurality of stud-style fasteners that attach at the lap joints.

4. The headliner assembly of claim 3, wherein each stud-style fastener of the plurality of stud-style fasteners is attached to a respective substantially straight segment of the intermediate segment.

5. A headliner assembly for a vehicle, the headliner assembly comprising:
   an intermediate segment having substantially parallel longitudinal edges,
      wherein each longitudinal edge of the substantially parallel longitudinal edges includes bent segments extending at an angle relative to the intermediate segment and substantially straight segments extending substantially straight relative to the intermediate segment, and
      wherein each substantially straight segment is positioned between a respective pair of bent segments;
   side segments that are separate from the intermediate segment and that have a respective longitudinal edge,
      wherein each respective longitudinal edge aligns with one longitudinal edge of the substantially parallel longitudinal edges,
      wherein each respective longitudinal edge includes side-segment bent portions that form butt joints with bent segments of the one longitudinal edge aligned therewith; and
      wherein each respective longitudinal edge includes side-segment straight portions that form lap joints with substantially straight segments of the one longitudinal edge aligned therewith; and
   a plurality of spring clips that attach at the butt joints and a plurality of stud-style fasteners that attach at the lap joints.

* * * * *